No. 723,677.  
PATENTED MAR. 24, 1903.  
C. F. KADE.  
BRACKET.  
APPLICATION FILED OCT. 10, 1902.  
NO MODEL.  
2 SHEETS—SHEET 1.
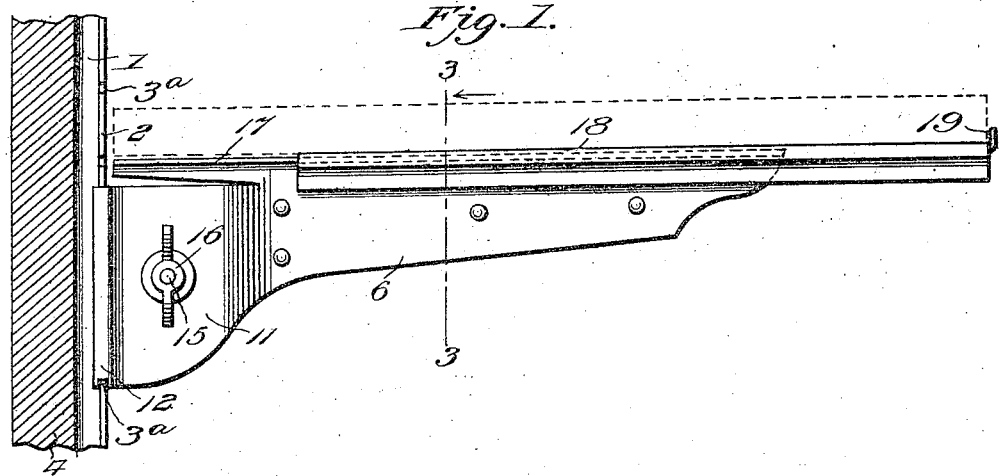
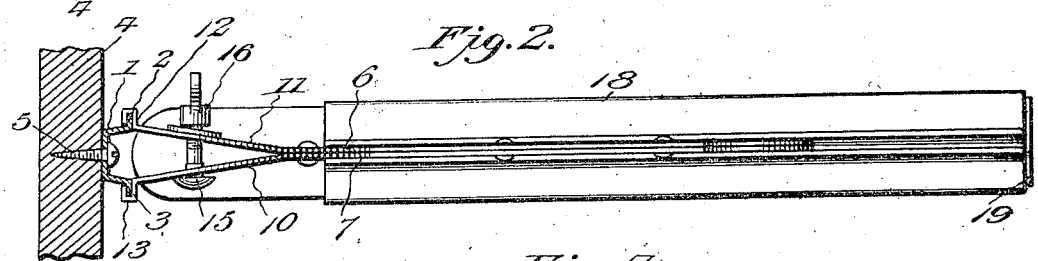
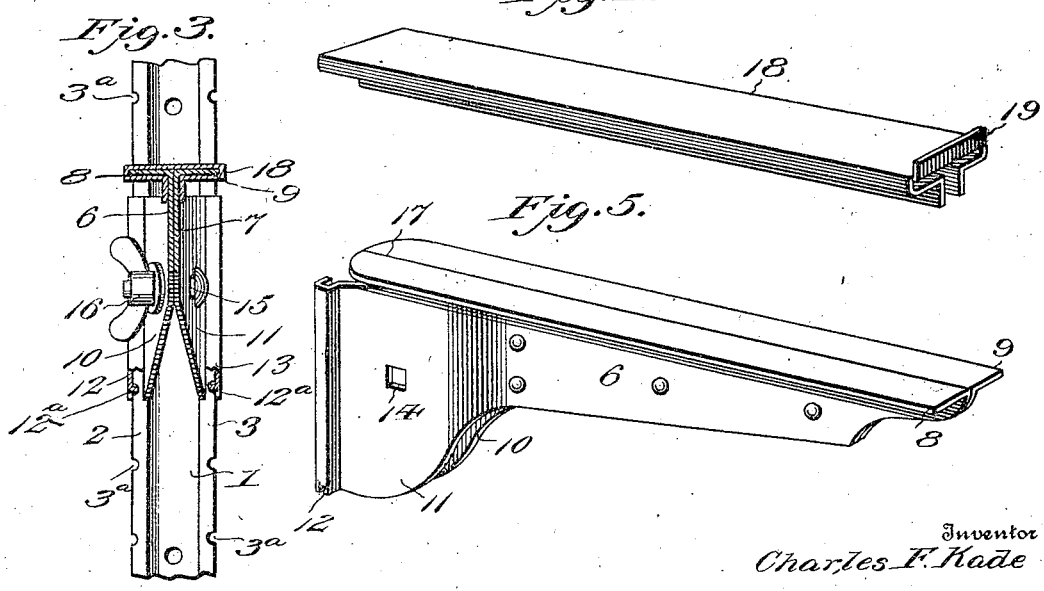
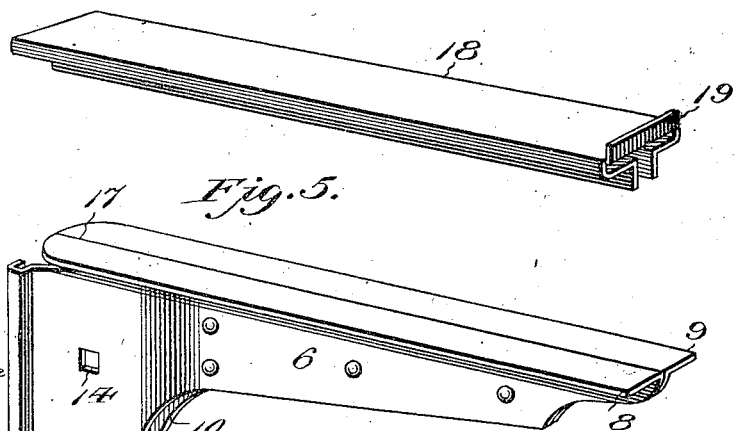
Inventor  
Charles F. Kade
Witnesses  
By  
Victor J. Evans  
Attorneys

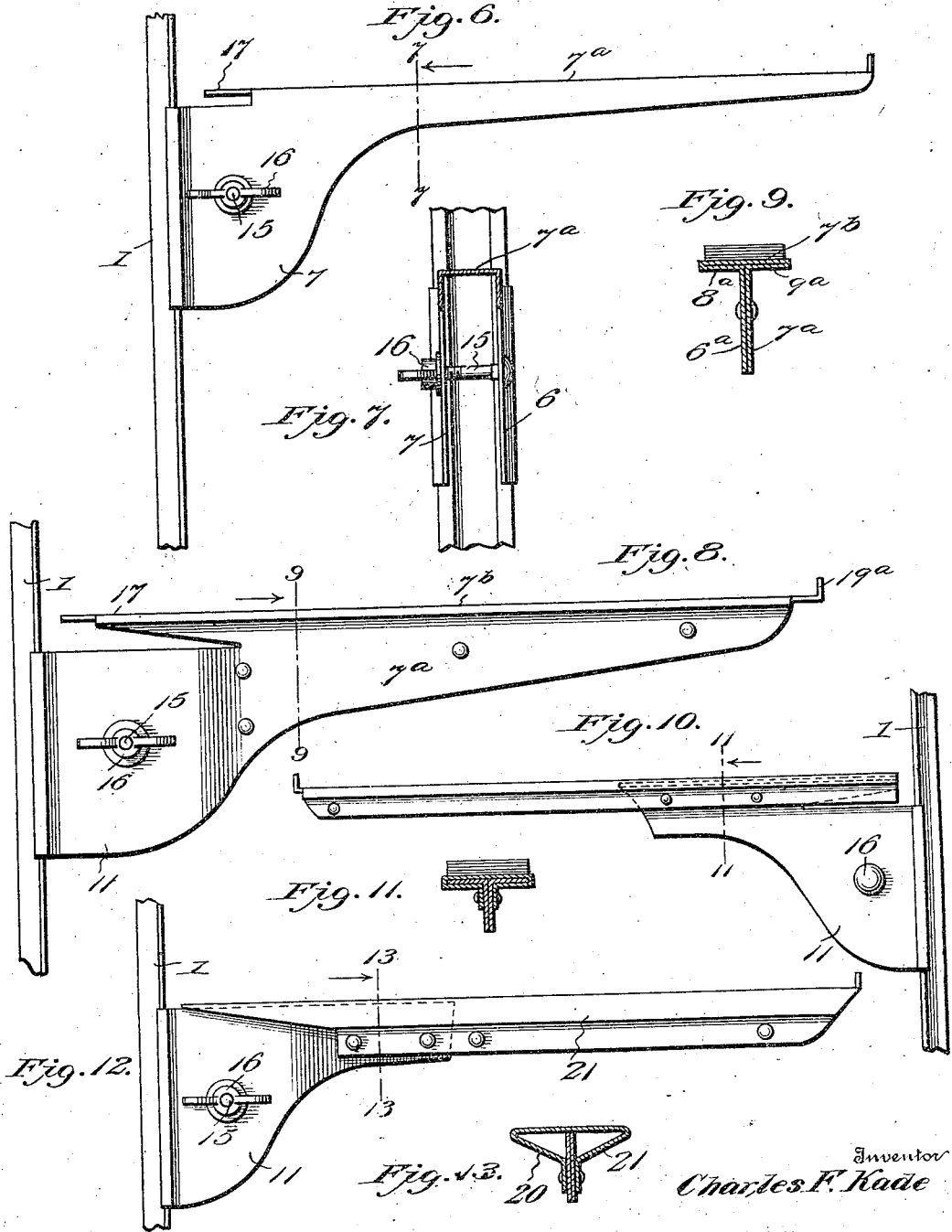

UNITED STATES PATENT OFFICE.

CHARLES F. KADE, OF SHEBOYGAN, WISCONSIN, ASSIGNOR TO ARTHUR F. WINTER, OF SHEBOYGAN, WISCONSIN.

BRACKET.

SPECIFICATION forming part of Letters Patent No. 723,677, dated March 24, 1903.

Application filed October 10, 1902. Serial No. 126,764. (No model.)

*To all whom it may concern:*

Be it known that I, CHARLES F. KADE, a citizen of the United States, residing at Sheboygan, in the county of Sheboygan and State of Wisconsin, have invented new and useful Improvements in Brackets, of which the following is a specification.

This invention relates to brackets; and the object thereof is particularly designed as an improvement on the invention forming the subject-matter of Patent No. 692,858, granted me February 11, 1902.

One of the principal objects of the invention is to construct a bracket so that the shelf-support and clamping-jaws can be made integral, but so that the jaws can move independently of the shelf-support.

Other objects, as well as the novel details of construction, will be specifically described hereinafter and illustrated in the accompanying drawings, in which—

Figure 1 is a side elevation of a bracket constructed in accordance with my invention and secured to a vertical support. Fig. 2 is a bottom plan view of the bracket. Fig. 3 is a cross-sectional view on the line 3 3 of Fig. 1. Fig. 4 is a detail perspective view of an extension-slide. Fig. 5 is a detail perspective view of the bracket, the slide and clamping-bolt being removed. Fig. 6 is a side elevation of a slightly-modified form of bracket. Fig. 7 is a cross-sectional view on the line 7 7 of Fig. 6. Fig. 8 is a side elevation of another slightly-modified form of bracket. Fig. 9 is a cross-sectional view on the line 9 9 of Fig. 8. Fig. 10 is a further modified form. Fig. 11 is a cross-sectional view on the line 11 11 of Fig. 10. Fig. 12 is a side elevation of a further modified form, and Fig. 13 is a cross-sectional view on the line 13 13 of Fig. 12.

The reference-numeral 1 designates a runner vertically disposed and preferably formed of a bar approximately U-shaped in cross-section and provided with oppositely-disposed flanges 2 and 3, provided with notches or seats $3^a$. This runner is secured to the wall or support 4 by suitable means, such as screws or other fastening device 5.

The brackets are adjustably fastened to the runner, and the form shown in Figs. 1 to 5 comprise two parallel webs 6 and 7, each of which is formed from a blank, the top portion being turned over to form a longitudinally-arranged supporting or guide flange 8 or 9, respectively. The two webs 6 and 7 are secured together for a portion of their length and then diverge toward their rear ends to form spring-jaws 10 and 11, which are bent at their rear extremities to form grooved engaging ends 12 and 13, in the grooves of which are inwardly-projecting teats or lugs $12^a$ to rest in the seats $3^a$ of the runner 1. The jaws are provided with alining perforations 14, through which projects a bolt 15, on one end of which is an adjusting-nut 16, which is designed to be turned so as to clamp the jaws to the rail. By reference to Fig. 1 it will be noticed that the upper portions of the webs are cut from a point at their rear ends to a point in rear of or adjacent to the point of divergence of the jaws, whereby an approximately V-shaped kerf is provided. This of course provides a rearwardly-projecting extension or shelf-support 17, which is a combination of the guide flanges or supports 8 and 9. The extension terminates near the end of the jaws and approximately adjacent to the runner 1. Thus a shelf-support will be provided for the entire length of the bracket and the jaws can swing at their points of divergence without affecting or imparting movement to the extensions 17 or the shelf-support. It will therefore be seen that a rigid bracket will be formed and the top edges will be secured for their entire length to the shelf or device which it supports.

18 designates an extension-slide, which is provided with a T-shaped groove adapted to fit over the oppositely-disposed flanges 8 and 9 and arranged on either side of the webs of the bracket-brace. On the end of this slide 18 is an upturned lip 19, which will prevent the shelf from slipping off the support, and by forcing the slide rearward the shelf can be clamped between the rail and the lip.

In Fig. 6 is illustrated a slightly-modified form, in which the webs 6 and 7 are spaced apart and connected by a strip $7^a$, which extends rearward, forming a finger $17^a$, a portion of the blank being cut away, so as to form a slot whereby the jaws 10 and 11 are adapted to be sprung apart and clamped upon the rail by means of the clamping device formed by the threaded bolt and nut.

In Figs. 8 and 9 are shown a further modified form, in which the entire bracket is formed of a single piece, the flanges 8ª and 9ª being connected by a strip 7ᵇ, which is an integral part of the flanges and formed with the webs 6ª and 7ª. This form of bracket can be struck up from a single piece of metal, and on the forward extremity of the strip 7ᵇ is a lip 19ª, which prevents longitudinal displacement of the supported device of the bracket.

In Figs. 10 and 11 is shown a form of bracket similar to that illustrated in Fig. 1—that is, the two webs are secured together and instead of a slide the extension device is fastened to the top of the webs of the bracket by means of bolts.

In Figs. 12 and 13 a further modified form is shown, in which the webs are fastened together and the flanges are dispensed with. In this form the strip extends beyond the sides of the webs a suitable distance and is provided with converging downwardly-projecting flanges 20 and 21, which are fastened to the sides of the webs.

Of course it will be obvious that many other slightly-modified forms may be employed provided the essential feature is retained—namely, providing the slot in the web, which extends from a point adjacent to the fulcrum of the jaws and terminates in the rear upper edge thereof, so that a firm support will be provided on the bracket in rear of the point of adjustment of the jaws and still permit the jaws to move freely.

Having thus fully described my invention, what I claim as new, and desire to secure by Letters Patent, is—

1. A bracket, comprising a pair of vertical parallel plates forming webs, the rear portions of the plates being disposed in divergent relation to form spring-jaws, each plate being formed with an elongated slit or slot extending from the rear end thereof to a point adjacent to the point of divergence of the jaws to form a rearwardly-extending finger projecting from the upper edge of the plates, to permit the jaws to operate independently without affecting the rigidity of the remaining portion of the bracket.

2. A bracket, comprising a pair of vertical parallel plates forming webs and secured to each other for a portion of their length and formed with alining slits extending from the rear of each plate to a point toward the forward end thereof, the rear ends of the plates below the slits being disposed in divergent relation to each other to form spring-jaws, the points of divergence of the jaws alining with the forward extremities of the slits for the purpose set forth.

In testimony whereof I affix my signature in presence of two witnesses.

CHARLES F. KADE.

Witnesses:
F. H. POTHIG,
P. J. PETERSON.